(12) United States Patent
Ayari et al.

(10) Patent No.: US 6,430,124 B1
(45) Date of Patent: Aug. 6, 2002

(54) APPARATUS FOR SCANNING OPTICAL RECORDING MEDIA HAVING A SCANNER AND A TRAVEL MEASURING DEVICE

(75) Inventors: Susann Ayari, Bad Dürrheim; Christoph Dietrich, Heidelberg, both of (DE)

(73) Assignee: Thomson Licensing, SA, Boulogne-Billancourt (FR)

( * ) Notice: Subject to any disclaimer, the term of this patent is extended or adjusted under 35 U.S.C. 154(b) by 0 days.

(21) Appl. No.: 09/466,756

(22) Filed: Dec. 17, 1999

(30) Foreign Application Priority Data

Dec. 17, 1998 (DE) .......................................... 198 58 199

(51) Int. Cl.⁷ .................................................. G11B 7/00
(52) U.S. Cl. .................................. 369/44.11; 369/53.29
(58) Field of Search ................................. 369/44.11, 43, 369/44.14, 53.11, 53.25, 53.28, 53.29, 99, 120, 124.01, 124.03

(56) References Cited

U.S. PATENT DOCUMENTS

| | | | |
|---|---|---|---|
| 4,542,989 A | 9/1985 | Remijan | |
| 4,613,916 A | 9/1986 | Johnson | |
| 4,977,539 A | 12/1990 | Lee | |
| 4,988,932 A | 1/1991 | Markis et al. | |
| 4,991,162 A | 2/1991 | Tabe | |
| 5,301,173 A | 4/1994 | Matsuda | 369/44.25 |
| 5,563,868 A | 10/1996 | Farnsworth et al. | |
| 5,774,295 A | 6/1998 | Tsai | |
| 5,982,494 A | * 11/1999 | Hercher | 369/44.17 |
| 6,002,483 A | 12/1999 | Powell | |

FOREIGN PATENT DOCUMENTS

DE 3829235 A1 3/1989
EP 0722166 7/1996

OTHER PUBLICATIONS

Patent Abstracts of Japan, vol. 1998, No. 8, Jun. 30, 1998, & JP 10 079180.
Search Report for European Patent Appln. No. 99124442.7 dated Dec. 14, 2001.
Patent Abstracts of Japan: JP 0580121140 AA.
German Search Report citing the above–listed references: AA, AM, and AN.

* cited by examiner

Primary Examiner—Paul W. Huber
(74) Attorney, Agent, or Firm—Joseph S. Tripoli; Joseph J. Laks; Frederick A. Wein

(57) ABSTRACT

The present invention relates to an apparatus for reading from and/or writing to optical recording media having a scanner for scanning the recording medium, a coarse drive for moving the scanner relative to the recording medium and a measuring device for determining the travel of the scanner.

The object of the present invention is to propose an apparatus of this type in which it is possible to determine the position of the scanner as exactly as possible, the intention being for this to be ensured even in the event of a high movement speed or acceleration.

This is achieved according to the invention by virtue of the fact that the measuring device has an optical interference generating means and an optical interference detection means.

The invention is particularly advantageous for apparatuses which require rapid access to extremely diverse locations on the recording medium, as is the case with apparatuses appertaining to optical data storage, for example CD-ROM or DVD-ROM apparatuses.

11 Claims, 3 Drawing Sheets

APPARATUS FOR SCANNING OPTICAL RECORDING MEDIA HAVING A SCANNER AND A TRAVEL MEASURING DEVICE

FIELD OF THE INVENTION

The present invention relates to an apparatus for reading from and/or writing to optical recording media by means of a scanner, the apparatus having a measuring device for determining the travel of a scanner.

BACKGROUND OF THE INVENTION

An apparatus of this type is disclosed in U.S. Pat. No. 4,977,539. The measuring device of this apparatus has a rotary disc provided with slots and a photosensor, which is used to detect the rotation of the rotary disk. The rotary disk is connected to a motor which drives the scanner. The known apparatus may be regarded as having the disadvantage that hysteresis occurs inter alia on account of the mechanical linking of the rotary disk to the motor and the geometrical conditions. It is not possible, therefore, to accurately determine the position of the scanner.

SUMMARY OF THE INVENTION

The object of the present invention is to propose an apparatus in which it is possible to determine the position of the scanner as exactly as possible, the intention being for this to be ensured even in the event of a high movement speed or acceleration.

To that end, the invention provides for the measuring device to have an optical interference generating means and also an optical interference detection means. According to the invention, the position of the scanner is determined by means of optical interference, which has the advantage that a high measurement accuracy is attained. A further advantage resides in the fact that no hysteresis occurs, as a result of which the high measurement accuracy is ensured even in the start-up and deceleration phases and at high speeds. The apparatus according to the invention therefore ensures rapid and exact access to data stored on the recording medium, irrespective of whether they are arranged contiguously or distributed at extremely diverse locations on the recording medium.

It is advantageous for the interference generating means or the interference detection means to be arranged on the scanner, while the corresponding other one is arranged such that it is immovable. If the optical interference generating means is arranged on the scanner and the interference detection means is arranged on a baseplate with respect to which the scanner can be displaced, this has the advantage that optical elements that are present on the scanner can also be utilized for the interference generating means and only a small number or no additional components are necessary. It is likewise advantageously possible to arrange the interference detection means on the scanner and the interference generating means on the baseplate. This has the advantage that the output signal of the interference detection means is directly available at the scanner, where other signals are also detected. Joint evaluation at the location of the scanner is thus made possible. So too is joint forwarding of the detected signals from the scanner to an evaluation unit, if appropriate after previous signal conditioning. This advantageously takes place on the scanner and extends from simple preamplification through to processing or combination of the individual signals.

According to a further refinement of the invention, only part of the optical interference generating means and/or of the optical interference detection means is arranged on the scanner and/or such that it is immovable. This has the advantage that the measuring device is arranged to the greatest possible extent on the same component, either on the scanner or immovably on the baseplate, while only part of the measuring device is arranged on the corresponding other part. This simplifies the adjustment and also the production of the measuring device. In an advantageous manner, just a mirror is arranged on the part remote from the rest of the measuring device, while the interference is effected for example by superposition of the reflected light beam with the output light beam.

A further refinement of the invention provides for the interference generating means to be arranged in the output beam path of an optical element having at least one further output beam path, in which another optical component utilized for the operation of the apparatus is arranged. This has the advantage that a previously unutilized output beam path is utilized for the purpose of generating interference. This means that an additional component for coupling out or generating the light utilized by the interference generating means is not necessary. In this case, the optical element may be a half-mirror or a beam splitter which serves for example for directing the beam reflected from the recording medium onto a detector element. An optical grating which generates possibly unutilized first- or higher-order output beams, if appropriate in the reflection direction, is also a possible configuration of the optical element. The optical recording medium itself, whose grating structure formed by tracks likewise generates first- and higher-order output beams, may also constitute the said optical element.

The invention provides for the interference generating means to have a prism. This has the advantage that part of the beam falling onto the interference generating means is deflected by means of the prism and this deflected beam is superposed with the other part of the beam. In this way, a light-dark pattern is obtained in the beam propagation direction, which pattern is detected by the interference detection means.

According to the invention, the interference detection means is a photoelement which detects light-dark differences. This has the advantage that intensity fluctuations do not have a disturbing influence. A suitable evaluation circuit can match the photoelement to a changed intensity, in which case, by way of example, the threshold value utilized for discriminating between light and dark is put at the median between maximum and minimum of the photosignal. The output signal of the photoelement is an output value that merely discriminates between light and dark, that is to say a digital output value. The travel can be precisely determined by counting the transitions of this output signal.

The invention provides for the effective area of the photoelement to be limited to half the spacing between two interference maxima of the interference pattern generated by the interference generating means. This has the advantage of enabling a clear discrimination of light-dark transitions even with a relatively large and thus cost-effective photoelement. In this case, the limitation is advantageously effected by inclining the photoelement in the beam path. It is likewise advantageous to perform the limitation by fitting a masking in front of the photoelement.

An advantageous method for determining the travel of a scanner of an apparatus for reading from or writing to optical recording media is specified in the method claim. In this case, the fact that the count is multiplied by a constant factor may result from the characteristic of the interference pattern.

However, more complicated functions are also conceivable which are characteristic of the corresponding interference pattern and according to which the travel is determined from the count. The utilization of a reference value table also lies within the scope of the method according to the invention.

It is understood that the features specified can also advantageously be applied within the scope of the invention in combinations other than those expressly described. This applies equally to developments which lie within the scope of expert ability. Further advantages of the invention are also specified in the following description of an advantageous exemplary embodiment with reference to the figures.

BRIEF DESCRIPTIONS OF THE DRAWINGS

DETAILED DESCRIPTION OF THE DRAWINGS

Figure 1:
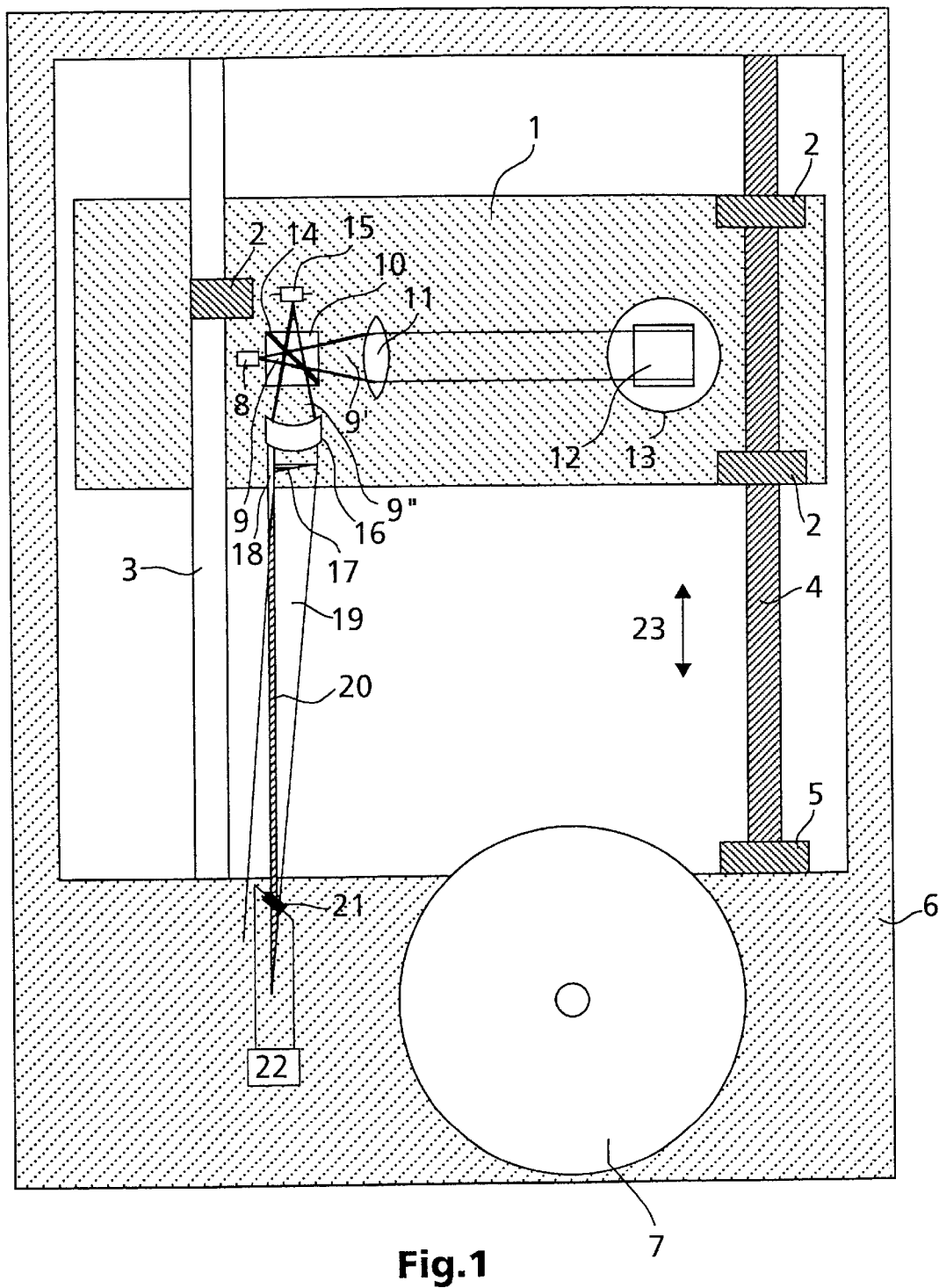
FIG. 1 shows part of an apparatus according to the invention in plan view.

FIG. 1 shows part of an apparatus according to the invention in plan view. A diagrammatically indicated scanner 1 is fixed to a guide rail 3 and a drive shaft 4 by means of holding elements 2. The drive shaft 4 is driven by a motor 5, which serves as a coarse drive. It has, for example, as indicated, a thread which interacts with corresponding threaded holes in the holding elements 2. The guide rail 3 and the drive shaft 4 and also the motor 5 are fixed to a baseplate 6 of the apparatus for reading from or writing to optical recording media. A disc motor (not visible here) is likewise fixed to the baseplate 6 and drives the disc turntable 7. An optical recording medium, for example a compact disc, can be placed onto the disc turntable 7 in order to be played. The scanner 1 has a laser diode 8, which emits a divergent light beam 9. The latter passes through a beam splitter 10 and is converted into a parallel light pencil by a collimator 11. The said parallel light pencil falls onto a mirror 12, which is arranged such that it is tilted through 45° with respect to the plane of the drawing. Said parallel light pencil is deflected by the said mirror in the direction perpendicular to the plane of the drawing. It then passes through the objective lens 13, which is situated above the plane of the drawing and is indicated here by a circle, and is focused by the said objective lens onto the recording medium (not illustrated here). It is reflected from the said recording medium, passes through the objective lens 13, is reflected by the mirror 12 and, after passing through the collimator 11, impinges on the reflecting plane 14 of the beam splitter 10, from where it is reflected to a detector element 15. The components described hitherto or components having similar function are usually present in apparatuses for reading from or writing to optical recording media, but are only indicated diagrammatically here. The variety of possible configurations and modifications are familiar to a person skilled in the art.

The divergent light beam 9 issuing from the laser diode 8 on the one hand passes through the beam splitter 10 uninfluenced; the corresponding output beam path 9' is correspondingly illustrated. On the other hand, it is partly reflected by the semi-transparent reflecting plane 14; the corresponding second output beam path 91" is likewise illustrated. The output beam path 9" is not usually utilized. According to the invention, a collimator 16 is arranged in the output beam path 9" and a parallel pencil of rays leaves the said collimator. A prism 17 is arranged after the collimator 16. A first partial beam 18 travels past the prism 17 uninfluenced, while a larger part of the beam is deflected by the prism 17 and intersects the first partial beam 18 as second partial beam 19. The overlap region 20 between first partial beam 18 and second partial beam 19 is marked by hatching.

A photoelement 21 is arranged on the baseplate 6 in the region of the overlap region 20. In the overlap region 20, interference occurs between first partial beam 18 and second partial beam 19, as the corresponding light-dark transitions are detected by the photoelement 21. An evaluation unit 22, which is only indicated diagrammatically here, determines the travel of the scanner 1 from the number of light-dark transitions resulting in the output signal of the photoelement 21.

The method for determining the travel of the scanner 1 thus has the following steps: first of all an interference pattern is generated. This is done continuously in the exemplary embodiment, but, within the scope of the invention, may perfectly well also be effected in each case directly before a jump. The light-dark transitions in the interference pattern are then counted during the movement operation. The travel is then determined from the count using the known characteristic of the interference pattern. In the simplest case, multiplying the count by a constant factor suffices for this purpose. In the case of a more complicated form of the interference pattern, a corresponding mathematical function is used or a stored table is resorted to, by way of example.

The motor 5 drives the drive shaft 4, which rotates, as a result of which the scanner 1 is moved in the direction of the arrow 23. At the same time, the overlap region 20 is displaced relative to the photoelement 21, as a result of which a plurality of light-dark transitions occur on the latter. In order to enable rapid access to specific data stored on the recording medium, for example a CD or a DVD, the scanner 1 must be positioned with relatively high accuracy in the course of the movement. In other words, the length of the travel relative to the baseplate 6 must be measured accurately. The interferometric system according to the invention is used for this purpose, in the case of which a number of light-dark transitions proportional to the travel are generated in the overlap region 20 and detected by means of the photoelement 21, for example a photodiode. According to the invention, the light from the laser diode 8 is utilized as light source in the exemplary embodiment, which light is coupled out in the scanner 1 by means of the beam splitter 10.

Figure 2:
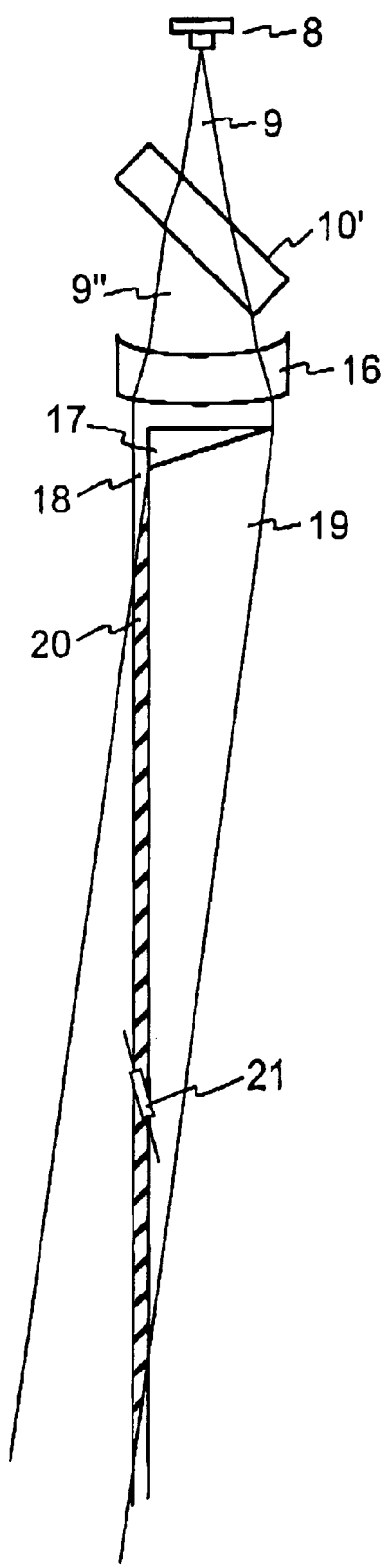
FIG. 2 shows the beam path of an apparatus according to the invention in a simplified illustration.

FIG. 2 shows part of the beam path of an apparatus according to the invention in a simplified illustration. The divergent light beam 9 emitted by the laser diode 8 in this case falls onto a half-mirror 10' instead of the beam splitter 10, and leaves the said half-mirror as second output pencil of rays 9". The first output pencil of rays 9' is not illustrated here, for the sake of simplicity. After passage through the collimator 16, a parallel light pencil is present which, as first partial beam 18, moves past the prism 17 or, as second partial beam 19, is deflected by the prism 17. The prism 17 is designed as a glass wedge in the exemplary embodiment. The second partial beam 19 is inclined slightly with respect to the optical axis and overlaps the partial beam 18, which runs parallel to the optical axis, in the overlap region 20, illustrated by hatching. An interference pattern is produced in the overlap region 20, which pattern likewise has a slight inclination with respect to the direction of movement of the scanner 1. This is illustrated in more detail in FIG. 3. The photoelement 21 fixed to the baseplate 6 detects the light-dark changes which, caused by the movement of the scanner 1, occur at the stationary location of the photoelement 21. On account of the slight path differences of the two partial beams 18, 19, the coherence length of the laser light suffices, despite modulation, to generate an adequate contrast in the interference pattern of the overlap region 20. In order to be able to detect the light-dark change with its high spatial frequency using a relatively large photodiode as photoelement 21, the photoelement 21 in FIG. 2 is arranged such that it is greatly inclined with respect to the optical axis.

Figure 3:
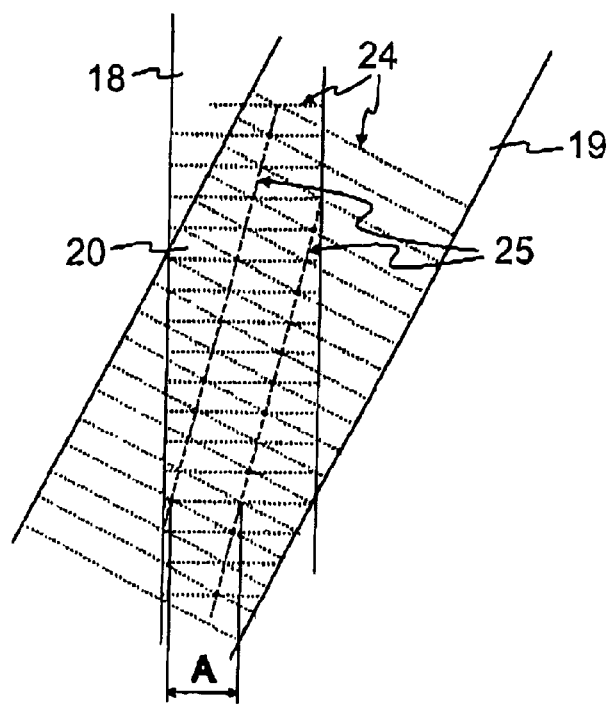
FIG. 3 shows an enlarged detail of the beam path with interference pattern.

FIG. 3 shows an enlarged detail of the beam path with interference pattern. Wavefronts 24 are illustrated as dotted lines in the first partial beam 18 and in the partial beam 19, the full width of which is not illustrated here. Interference maxima form at the points of intersection of the wavefronts 24 of the first partial beam 18 and of the second partial beam 19. The interference stripes 25 thus formed are illustrated as broken lines. Between them there is an interference minimum, a dark region. The interference stripes 25 occur only in the overlap region 20, which is relatively small in the illustration of the second partial beam 19 in FIG. 3, the said illustration being inclined in an exaggerated fashion and being too narrow. The spacing A between the interference stripes 25 in a plane perpendicular to the optical axis is illustrated. It specifies the upper limit for the effective width of the area of the photoelement 21 which is necessary in order to be able to resolve the light-dark separations.

Figure 4:
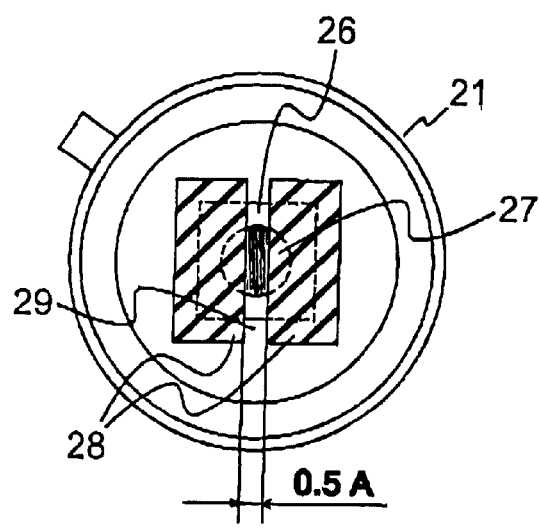
FIG. 4 shows an advantageous refinement of an interference detection means.

In accordance with the exemplary embodiment of FIGS. 1 and 2, the photoelement 21 is arranged in an inclined manner. A further advantageous refinement of the photoelement 21 is shown in FIG. 4. The photoelement 21 has a semiconductor area 26, which is illustrated as square here and on which there is a circular sensitive area 27. Arranged in front of the semiconductor area 26 in the illustration above the plane of the drawing is a mask 28, which comprises two rectangles illustrated here by hatching. The gap 27 formed by the mask 28 has the width A/2. This ensures that the effective area of the sensitive area 27 of the photoelement 21 is only about half as wide as the spacing between two interference stripes 25 when projected onto the semiconductor area 26. The accuracy with which the required components have to be positioned in the apparatus is not critical insofar as the system can be calibrated. For this purpose, by way of example, a defined travel is related to the light-dark changes that are counted. The corresponding proportionality factor is utilized for all further measurements of the travel. This calibration can be effected once, preferably during the production of the apparatus. It is advantageous, however, for the said calibration to be carried out at more or less regular intervals, for example each time the apparatus is switched on. Errors possibly caused by aging or other influences can be avoided in this way. Further advantages of the present invention reside in the fact that a separate radiation source is not necessary, rather an unutilized portion of the light generated by the laser diode 8 is used. The arrangement of the measuring device according to the invention necessitates only a small structural and optical outlay on the scanner. Nevertheless, a high accuracy can be attained, and hysteresis does not occur since the measuring device according to the invention is independent of rotating parts. According to the invention, the measurement signal generation can be integrated in the scanner 1, as a result of which it is decoupled to the greatest possible extent from the remaining mechanisms. The invention is particularly advantageous for apparatuses which require rapid access to extremely diverse locations on the recording medium, as is the case with apparatuses appertaining to optical data storage, for example CD-ROM or DVD-ROM apparatuses.

What is claimed is:

1. Apparatus for reading from and/or writing to optical recording media, the apparatus comprising a scanner for scanning a recording medium, a coarse drive for moving the scanner relative to the recording medium and a measuring device for determining the travel of the scanner, the measuring device comprising an optical interference generating means and an optical interference detection means, wherein the optical interference generating means is arranged in an output beam path of an optical element having at least one further output beam path, in which further optical beam path a second optical component utilized for the operation of the apparatus is arranged.

2. Apparatus according to claim 1, wherein the optical interference generating means comprises a prism.

3. Apparatus according to claim 1, wherein the optical interference detection means is a photoelement which detects light-dark differences.

4. Apparatus according to claim 3, wherein the effective area of the photoelement is limited to half the spacing between two interference maxima of the interference pattern generated by the interference generating means.

5. Apparatus according to claim 1, wherein one of the optical interference generating means and optical interference detection means is arranged on the scanner, while the other of the optical interference generating means and optical interference detecting means is arranged such that it is immovable.

6. Apparatus according to claim 5, wherein only part of one of the optical interference generating means and the optical interference detection means is arranged on said scanner.

7. Apparatus according to claim 5, wherein only part of one of the optical interference generating means and the optical interference detection means is arranged such that it is immovable.

8. Apparatus according to claim 5, wherein the optical interference generating means comprises a prism.

9. Apparatus according to claim 5, wherein the optical interference detection means is a photoelement which detects light-dark differences.

10. Apparatus according to claim 9, wherein the effective area of the photoelement is limited to half the spacing between two interference maxima of the interference pattern generated by the interference generating means.

11. Method for determining the travel of a scanner of an apparatus for reading from and/or writing to optical recording media, comprising the steps of:

generating an interference pattern using an un-utilized output beam path of an optical element having at least one further output beam path, in which a second optical component utilized for the operation of the apparatus is arranged, starting a movement operation, counting the transitions in the interference pattern which occur during the movement operation, and determining the travel of the scanner by means of the count using the characteristic of the interference pattern.

* * * * *